(12) United States Patent
Li et al.

(10) Patent No.: US 9,569,470 B2
(45) Date of Patent: Feb. 14, 2017

(54) MANAGING SHARING RELATIONSHIP OF TABLES

(71) Applicant: INTERNATIONAL BUSINESS MACHINES CORPORATION, Armonk, NY (US)

(72) Inventors: Shuo Li, Beijing (CN); Xin Ying Yang, Beijing (CN); Mai Zeng, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/458,313

(22) Filed: Aug. 13, 2014

(65) Prior Publication Data
US 2015/0066994 A1 Mar. 5, 2015

(30) Foreign Application Priority Data
Aug. 27, 2013 (CN) .......................... 2013 1 0379149

(51) Int. Cl.
*G06F 17/30* (2006.01)
*G06F 7/00* (2006.01)

(52) U.S. Cl.
CPC .............. *G06F 17/30292* (2013.01)

(58) Field of Classification Search
USPC ....................................................... 707/807
See application file for complete search history.

(56) References Cited

U.S. PATENT DOCUMENTS

| 7,428,546 | B2 * | 9/2008 | Nori ................. G06F 17/30595 |
| 7,529,728 | B2 | 5/2009 | Weissman et al. |
| 8,037,108 | B1 * | 10/2011 | Chang .................. G06F 17/303 707/803 |
| 8,112,445 | B2 | 2/2012 | Weissman et al. |

(Continued)

OTHER PUBLICATIONS

Aulbach, Stefan et al., "Multi-Tenant Databases for Software as a Service: Schema-Mapping Techniques," Proceedings of the 2008 ACM SIGMOD International Conference on Management of Data, Jun. 2008, 12 pages.

(Continued)

*Primary Examiner* — Kuen Lu
(74) *Attorney, Agent, or Firm* — Margaret McNamara, Esq.; Blanche E. Schiller, Esq.; Heslin Rothenberg Farley & Mesiti P.C.

(57) ABSTRACT

Managing a sharing relationship of tables. A super schema is formed incorporating a plurality of tables in a database according to data types of respective columns of the plurality of tables. A free storage capacity of the super schema is evaluated according to holes not occupied by any table in the super schema. A sharing relationship of the plurality of tables is determined according to the free storage capacity of the super schema. The sharing relationship of a large number of tables in a database can be managed effectively, so as to design or optimize the sharing solution among the tables.

20 Claims, 11 Drawing Sheets

(56) References Cited

U.S. PATENT DOCUMENTS

| | | | |
|---|---|---|---|
| 8,200,705 | B2 | 6/2012 | Wang et al. |
| 8,380,667 | B2 | 2/2013 | Driesen |
| 8,386,471 | B2 | 2/2013 | Collins et al. |
| 8,943,029 | B2* | 1/2015 | Marwah .................. 707/607 |
| 2004/0117408 | A1* | 6/2004 | Bharadwaj ........ G06F 17/30286 |
| 2008/0270459 | A1 | 10/2008 | Grewal et al. |
| 2009/0063526 | A1* | 3/2009 | Tremaine .......... G06F 17/30584 |
| 2009/0276477 | A1 | 11/2009 | Thuringer et al. |
| 2010/0205227 | A1 | 8/2010 | Weissman et al. |
| 2010/0281016 | A1 | 11/2010 | Weissman et al. |
| 2011/0246449 | A1 | 10/2011 | Collins et al. |
| 2012/0066020 | A1 | 3/2012 | Moon et al. |
| 2012/0221608 | A1 | 8/2012 | An et al. |
| 2012/0310965 | A1 | 12/2012 | Gao et al. |
| 2013/0046799 | A1 | 2/2013 | Hale et al. |
| 2013/0166568 | A1* | 6/2013 | Binkert ............. G06F 17/30911 707/741 |
| 2013/0318129 | A1* | 11/2013 | Vingralek ......... G06F 17/30595 707/803 |
| 2014/0304263 | A1* | 10/2014 | Vaitheeswaran .. G06F 17/30598 707/737 |
| 2014/0325163 | A1* | 10/2014 | Arndt ................. G06F 12/1036 711/153 |

OTHER PUBLICATIONS

Aulbach, Stefan, "Schema Flexibility and Data Sharing in Multi-Tenant Databases," May 2012, 146 pages.

Chong, Frederick et al., "Architecture Strategies for Catching the Long Tail," Microsoft Corporation, Apr. 2006, 18 pages.

Chong, Frederick et al., "Multi-Tenant Data Architecture," Microsoft Corporation, Jun. 2006, 15 pages.

Elmore, Aaron J. et al., "Towards an Elastic and Autonomic Multitenant Database," NetDB'11, Jun. 2011, 6 pages.

Foping, Franclin S. et al., "A New Hybrid Schema-Sharing Technique for Multitenant Applications," ICDIM 2009 4$^{th}$ International Conference on Digital Information Management, Nov. 2009, 6 pages.

Hacigumus, Hakan et al., "Providing database as a Service," Proceedings of the 18$^{th}$ International Conference on Data Engineering, Feb. 2002, 10 pages.

Schiller, Oliver et al., "Native Support of Multi-tenancy in RDBMS for Software as a Service," EDBT/ICDT'11 Proceedings of the 14$^{th}$ International Conference on Extended Database Technology, Mar. 2011, 12 pages.

\* cited by examiner

FIG. 4A

| T1 | T1.C1 | T1.C2 | T1.C3 | T1.C4 | T1.C5 | T1.C6 | T1.C7 | T1.C8 | T1.C9 | T1.C10 | T1.C11 | T1.C12 |
|---|---|---|---|---|---|---|---|---|---|---|---|---|

FIG. 4B

| | C1 | C2 | C3 | C4 | C5 | C6 | C7 | C8 | C9 | C10 | C11 | C12 |
|---|---|---|---|---|---|---|---|---|---|---|---|---|
| T1 | T1.C1 | T1.C2 | T1.C3 | T1.C4 | T1.C5 | T1.C6 | T1.C7 | T1.C8 | T1.C9 | T1.C10 | T1.C11 | T1.C12 |
| T2 | T2.C1 | T2.C3 | | T2.C2 | T2.C4 | | | | | | | T2.C5 |

FIG. 5

| | C1 | C2 | C3 | C4 | C5 | C6 | C7 | C8 | C9 | C10 | C11 | C12 |
|---|---|---|---|---|---|---|---|---|---|---|---|---|
| T1 | T1.C1 | T1.C2 | T1.C3 | T1.C4 | T1.C5 | T1.C6 | T1.C7 | T1.C8 | T1.C9 | T1.C10 | T1.C11 | T1.C12 |
| T6 | | T6.C1 | T6.C2 | | T6.C3 | | T6.C4 | | T6.C5 | T6.C6 | | |
| T7 | | | | T7.C1 | | T7.C3 | | T7.C2 | T7.C4 | | T7.C5 | T7.C6 |
| T2 | | T2.C1 | T2.C3 | | T2.C2 | T2.C4 | | | | | | T2.C5 |
| T3 | T3.C1 | | T3.C2 | T3.C4 | | | | | T3.C5 | | | T3.C3 |
| T5 | | T5.C1 | | T5.C2 | | | | | | | | T5.C3 / T5.C4 |
| T10 | | T10.C1 | | | | | T10.C3 | | T10.C2 | T10.C4 | | |
| T8 | | T8.C1 | | | | | | | | | | T8.C3 / T8.C2 |
| T9 | T9.C2 | | | | T9.C1 | | | T9.C3 | | | | |
| T4 | T4.C1 | | | | | | | | | | | T4.C2 |

| | T1.C1 | T1.C2 | T1.C3 | T1.C4 | T1.C5 | T1.C6 | T1.C7 | T1.C8 | T1.C9 | T1.C10 | T1.C11 | T1.C12 |
|---|---|---|---|---|---|---|---|---|---|---|---|---|
| T1 1000 | T1.C1 | T1.C2 | T1.C3 | T1.C4 | T1.C5 | T1.C6 | T1.C7 | T1.C8 | T1.C9 | T1.C10 | T1.C11 | T1.C12 |
| T6 1000 | | T6.C1 | T6.C2 | | T6.C3 | | T6.C4 | | T6.C5 | | T6.C6 | |
| T10 4000 | | T10.C1 | | | | | T10.C3 | | T10.C2 | | T10.C4 | |
| T9 1500 | T9.C2 | | | | T9.C1 | | | T9.C3 | | | | |

| T7 3000 | | | | T7.C1 | T7.C2 | T7.C3 | T7.C4 | | T7.C6 | T7.C5 | | |
|---|---|---|---|---|---|---|---|---|---|---|---|---|
| T2 2000 | | T2.C1 | T2.C3 | | T2.C2 | T2.C4 | | | T2.C5 | | | |
| T3 500 | T3.C1 | | T3.C2 | T3.C4 | | | | T3.C5 | T3.C3 | | | |
| T5 1500 | | T5.C1 | | T5.C2 | | | | | T5.C3 | | T5.C4 | |
| T8 2000 | | T8.C1 | | | | | | | T8.C3 | | | T8.C2 |
| T4 3000 | T4.C1 | | | | | | | | | T4.C2 | | |

FIG. 8A

| | | | | | T7.C1 | | T7.C3 | T7.C2 | T7.C4 | T7.C6 | T7.C5 | | |
|---|---|---|---|---|---|---|---|---|---|---|---|---|---|
| T7 3000 | | | | | | | | | | | | | |
| T2 2000 | | T2.C1 | T2.C3 | | | T2.C2 | T2.C4 | | | T2.C5 | | | |
| T3 500 | T3.C1 | | | T3.C2 | T3.C4 | | | | T3.C5 | T3.C3 | | | |
| T5 1500 | | T5.C1 | | T5.C2 | | | | | | T5.C3 | | T5.C4 | |
| T8 2000 | | T8.C1 | | | | | | | | T8.C3 | | | T8.C2 |
| T4 3000 | T4.C1 | | | | | | | | | | T4.C2 | | |

FIG. 8B

| | | | | | T7.C1 | | T7.C3 | T7.C2 | T7.C4 | T7.C6 | T7.C5 | | |
|---|---|---|---|---|---|---|---|---|---|---|---|---|---|
| T7 3000 | | | | | | | | | | | | | |
| T2 2000 | | T2.C1 | T2.C3 | | | T2.C2 | T2.C4 | | | T2.C5 | | | |
| T3 500 | T3.C1 | | | T3.C2 | T3.C4 | | | | T3.C5 | T3.C3 | | | |
| T5 1500 | | T5.C1 | | T5.C2 | | | | | | T5.C3 | | T5.C4 | |
| T8 2000 | | T8.C1 | | | | | | | | T8.C3 | | | T8.C2 |
| T4 3000 | T4.C1 | | | | | | | | | | T4.C2 | | |

ST11

| T1 1000 | T1.C1 | T1.C2 | T1.C3 | T1.C4 | T1.C5 | T1.C6 | T1.C7 | T1.C8 | T1.C9 | T1.C10 | T1.C11 | T1.C12 |
|---|---|---|---|---|---|---|---|---|---|---|---|---|

| T6 1000 | T6.C1 | T6.C2 | T6.C3 | T6.C4 | T6.C5 | T6.C6 |
|---|---|---|---|---|---|---|
| T10 4000 | T10.C1 | | T10.C3 | | T10.C2 | T10.C4 |
| T9 1500 | T9.C2 | | T9.C1 | | | T9.C3 |

| T7 3000 | T7.C1 | | T7.C3 | T7.C2 | T7.C4 | T7.C6 | T7.C5 |
|---|---|---|---|---|---|---|---|
| T2 2000 | T2.C1 | | | T2.C3 | T2.C2 | T2.C4 | T2.C5 |
| T3 500 | T3.C1 | | T3.C2 | T3.C4 | | T3.C5 | T3.C3 |

| T5 1500 | T5.C1 | T5.C2 | T5.C3 | T5.C4 |
|---|---|---|---|---|
| T8 2000 | T8.C1 | | T8.C3 | | T8.C2 |
| T4 3000 | T4.C1 | | | T4.C2 |

FIG. 9D

MANAGING SHARING RELATIONSHIP OF TABLES

PRIOR FOREIGN APPLICATION

This application claims priority from Chinese patent application number 201310379149.0, filed Aug. 27, 2013, which is hereby incorporated herein by reference in its entirety.

BACKGROUND

One or more aspects of the present invention relate to a database, as well as to tables in the database, and more specifically, to managing a sharing relationship of the tables.

With the development of information technology and the Internet, resource sharing becomes a trend. For instance, in the field of databases, a plurality of users may share a same database so as to realize the maximum possible resource sharing with a deployment of high-density and to save hardware and software costs. Each user does not own the shared database exclusively, so such a user is usually called a "tenant" which is indicative of a logic entity that uses the database service. On the other hand, in the mean time of sharing, it needs to isolate data of respective tenants from each other considering safety needs and to satisfy individual requirements of respective tenants. Therefore, as for a database that supports multiple tenants, a balance is needed between sharing and isolating.

More specifically, isolating of data usually means that different tenants use tables of different schemas to store the respective data. However, sharing of data means that to some extent, a plurality of tenants need to keep some consistency on the schema so as to share the tables at least partially. There are some prior art of dealing with the requirement of schema diversity using a PIVOT table, a private table, Pre-allocated fields, custom columns, chunk folding and some schema mapping techniques to realize sharing of data. However, the solutions for dealing with the requirement of schema diversity still has some drawbacks, like sparse data, extra expensive join effort, extra predicates and hard usage of index on customized columns. Some solutions are logically shared schema with physically isolated tables. Some solutions are native support of a physically shared table, but they need extra operations and cost like data dictionary lookup, table descriptor mapping, data type mapping, field pointer linking, etc. for realizing sharing.

BRIEF SUMMARY

With respect to the problems stated above, one or more aspects of the present invention provide a more effective sharing solution for multiple tables in a database. In one aspect, an effective sharing schema for a large number of tables in a database is provided so as to realize sharing efficiently.

According to one embodiment of the invention, there is provided a method for managing a sharing relationship of tables, comprising: forming a super schema incorporating a plurality of tables in a database according to data types of respective columns of the plurality of tables; evaluating a free storage capacity of the super schema according to holes not occupied by any table in the super schema; and determining the sharing relationship of the plurality of tables according to the free storage capacity of the super schema.

According to another embodiment of the invention, there is provided an apparatus for managing a sharing relationship of tables, comprising: a forming unit configured to form a super schema incorporating a plurality of tables in a database according to data types of respective columns of the plurality of tables; an evaluating unit configured to evaluate a free storage capacity of the super schema according to holes not occupied by any table in the super schema; and a determining unit configured to determine the sharing relationship of the plurality of tables according to the free storage capacity of the super schema.

A sharing relationship among multiple tables in a database may be managed effectively so as to design or optimize a sharing solution for the tables.

BRIEF DESCRIPTION OF THE SEVERAL VIEWS OF THE DRAWINGS

Through the more detailed description of some embodiments of the present disclosure in the accompanying drawings, the above and other objects, features and advantages of aspects of the present disclosure will become more apparent, wherein the same reference generally refers to the same components in the embodiments of the present disclosure.

FIGS. 4A and 4B show an example of a super schema in a forming process;

FIG. 5 shows a super schema formed according to an embodiment;

FIGS. 7A-7B show an example of two super schemas obtained by splitting;

FIGS. 8A-8B show an arrangement of hole matrixes in a super schema ST2;

FIGS. 9A-9D show four super schemas obtained by splitting according to an embodiment;

DETAILED DESCRIPTION

Figure 1:
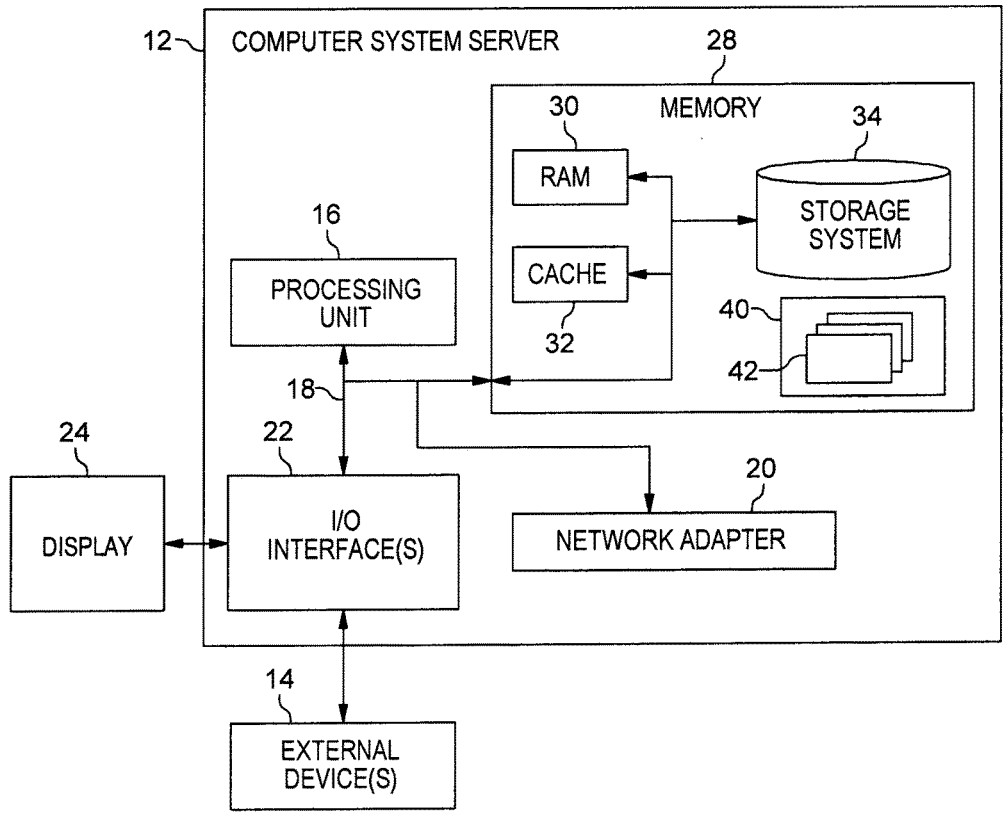
FIG. 1 shows a block diagram of an exemplary computer system/server 12 which is applicable to implement the embodiments of the present invention.

Some embodiments will be described in more detail with reference to the accompanying drawings, in which the embodiments of the present disclosure have been illustrated. However, aspects of the present disclosure can be implemented in various manners, and thus should not be construed to be limited to the embodiments disclosed herein. On the contrary, those embodiments are provided for the thorough and complete understanding of aspects of the present disclosure, and completely conveying the scope of aspects of the present disclosure to those skilled in the art.

As will be appreciated by one skilled in the art, aspects of the present invention may be embodied as a system, method or computer program product. Accordingly, aspects of the present invention may take the form of an entire hardware embodiment, an entire software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The respective embodiments of the present invention will be described in combination with the accompanying drawings and specific examples. In the embodiments of the present invention, in order to manage a sharing relationship of a plurality of tables in a database, first, a suppositive super schema is formed based on data types of the plurality of tables, and then, a free storage capacity of the super schema is evaluated according to holes not taken up by any table in the super schema. Based on the free storage capacity of the super schema formed assumptively, the sharing relationship of the plurality of tables, for instance, whether the plurality of tables share and use the super schema, may be determined.

Figure 2:
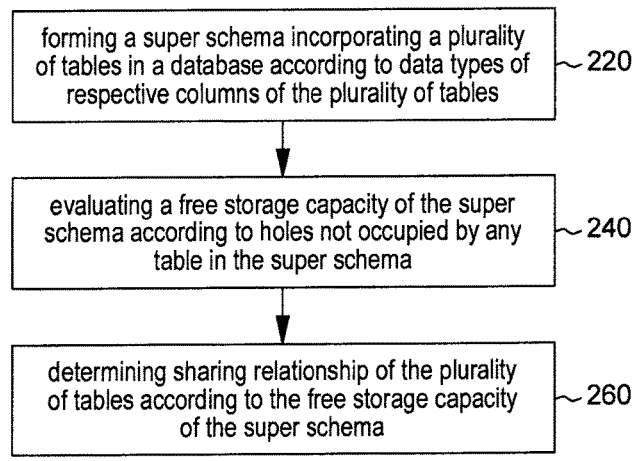
FIG. 2 shows a flow chart of a method for managing the sharing relationship of tables according to an embodiment of the present invention.

With reference now to FIG. 2, it shows a flow chart of a method for managing the sharing relationship of tables according to an embodiment of the present invention. As shown in FIG. 2, first, in step 220, a super schema incorporating a plurality of tables in a database is formed according to data types of respective columns of the plurality of tables; then, in step 240, a free storage capacity of the super schema is evaluated according to holes not occupied by any table in the super schema; and then, in step 260, the sharing relationship of the plurality of tables is determined according to the free storage capacity of the super schema. One or more ways to execute the steps above will be described below in combination with specific examples in a typical situation.

In a typical scenario, there has been a large number of tables stored in a database. In one situation, respective tables in the database use their respective schemas to store data separately and independently, and there is no sharing among the tables; in another situation, some tables have formed sharing groups according to a certain solution. However, the existing sharing solutions and sharing groups may not be ideal. In order to design or optimize the sharing solutions of the tables globally, the method as shown in FIG. 2 may be used, in one example, to manage the sharing relationship of the tables so as to design or rearrange the sharing solutions and sharing groups.

Therefore, first, in step 220, a super schema is formed which incorporates a plurality of tables in the database according to the data types of respective columns in the tables. In an embodiment, the plurality of tables are all tables stored in the database. In another embodiment, the plurality of tables are a part of the tables stored in the database. In an embodiment, the plurality of tables are directed to a same industry field, e.g. Telecom, Banking, Manufacture, Retails industries, etc., for tables of the same industry field usually have similar structure features, and thus are more likely to be shared. For similar reasons and considerations, in another embodiment, the plurality of tables are directed to a same region, or to a same time period. In an embodiment, the plurality of tables are stored respectively and independently; in another embodiment, at least part of the plurality of tables has formed sharing groups.

As for the aforementioned plurality of tables, in order to form a super schema incorporating the plurality of tables, the data types of respective columns of the tables are considered. Specifically, respective columns of the super schema are formed based on data types such that columns from different tables but with compatible data types are placed in a same column in the super schema. In an embodiment, the super schema may be formed by adding respective columns of the plurality of tables one by one.

Figure 3:
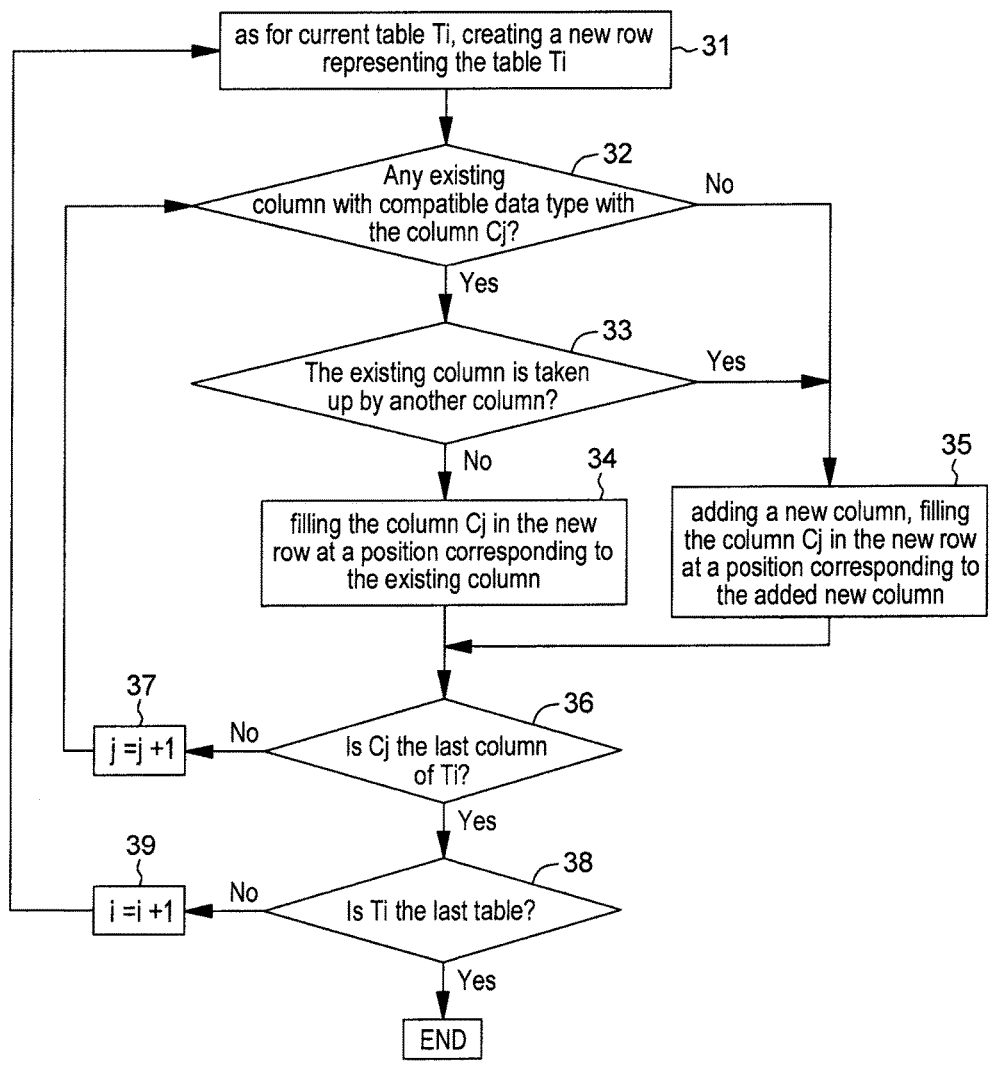
FIG. 3 shows steps of adding tables to form a super schema according to an embodiment.

FIG. 3 shows steps of adding tables to form the super schema according to an embodiment. As shown in FIG. 3, first, in step 31, as for the current table Ti, a new row indicative of the table is created. Generally, the table Ti has a plurality of rows, say, m rows, and a plurality of columns, say, n columns. In an embodiment, in step 31, m new rows are created to represent m rows of the Ti respectively. In another embodiment, in step 31, only one new row is created for a table; however, the new row is made to represent m real rows of the table Ti in some recording manners such as mark and index.

Then, a certain column, such as the jth column Cj, in the table Ti is considered. Specifically, in step 32, it is judged whether there is an existing column in the super schema which has a data type compatible with that in the column Cj. It will be appreciated, in a typical situation, the table Ti defines data types of the respective columns in the 0th row (a non-data row). In other situations, the table Ti may also record and define the data types of the respective n columns in other manners. On the other hand, the super schema may also record the data types of the respective existing columns. The above data types include various types identifiable by databases, such as real, integer, small integer (small int), character (char), variable character (varchar) and time, etc. It will be appreciated that the same data types are necessarily compatible with each other. In addition, similar data types may also be compatible therebetween. For instance, the integer, big int and small int may be regarded as compatible data types, for these data types all define the integer data, but with different allowable bytes or data lengths. Similarly, "char" and "varchar" may be regarded as compatible data types. With respect to this regard, those skilled in the art are capable of determining whether two data types are compatible or not according to a standard existing in the prior art. Based on this, in step 32, the data type of the column Cj of the table Ti may be determined first, and then the data type shall be compared to data types of the respective existing columns in the super schema so as to judge whether there is an existing column having a compatible data type with the column Cj in the super schema.

If there is an existing column having a data type compatible with the column Cj in the super schema, the process goes forward to step 33 to proceed with judging whether a position in the new row created for Ti corresponding to the abovementioned existing column has been occupied or taken up by another column in the same table Ti. If not, it goes forward to step 34 to fill the column Cj in the new row at the position corresponding to the abovementioned existing column.

In an embodiment, it is possible that there are multiple existing columns in the super schema which are compatible with the data type of the column Cj. In such a situation, the free existing columns not taken up by other columns of the table Ti in the existing columns may be obtained by the judging step 33. If there are multiple free existing columns, in step 34, an existing column whose data type has the highest degree of compatibility with the data type of Cj is selected, and the column Cj is filled in the new row at the position corresponding to the selected existing column which has the highest degree of compatibility. As to the degree of compatibility of the data types, those skilled in the art are capable of making judgment according to an existing standard. For instance, the totally same data types have the highest degree of compatibility. As to the data types which are compatible but not totally the same, it may be considered that the data types whose byte lengths are of a smaller difference have a higher degree of compatibility. For instance, when it is assumed that the data type of the column Cj is variable character whose maximum length is 1000 bytes (varchar 1000), and the data types of two free existing candidate columns are character with maximum length of 500 bytes and character with maximum length of 800 bytes, it can be deemed that the data type of character with maximum length of 800 bytes has a higher degree of compatibility with the data type of Cj.

On the other hand, if there is no existing column whose data type is compatible with that of the column Cj in the super schema (i.e. the judging result of step 32 is no), or if all the positions corresponding to the existing compatible columns have been occupied or taken up by other columns of the Ti (i.e. the judging result of step 33 is yes), the process goes forward to step 35 to create a new column in the super schema and fill the column Cj in the new row at a position corresponding to the newly created column. Furthermore, the data type of the Cj shall serve as the data type of the new column.

After step 34 or step 35, in step 36, it is judged whether the column Cj is the last column of the table Ti. If the Cj is not the last column of the Ti, in step 37, j is added by 1, which means that the process goes forward to the next column. Then, it returns to step 32, repeatedly executes steps 32-36 and processes respective columns in the Ti till the last column of the Ti is processed. At this moment, the process goes forward to step 38 to judge whether the current table Ti is the last one of the plurality of tables to be processed. If not, in step 39, i is added by 1, which means that it goes forward to the next table. Then, it returns to step 31 to create a new row for the next table and respectively processes its columns till all the columns of all the tables in the plurality of tables are processed. By adding and filling respective columns of the respective tables one by one, the formed super schema may incorporate or include the plurality of tables. Furthermore, in such a super schema, the columns having compatible data types from different tables share a same column in the super schema.

In an embodiment, the process of forming the super schema includes determining data types of respective columns of the super schema. As stated above, the same column in the super schema may have a plurality of compatible data types. The data type having a maximum byte length in the compatible data types may be regarded as the data type of the column of the super schema.

One embodiment of execution of the steps in FIG. 3 is described below in combination with an example. In this concrete example, it is assumed to form a super schema based on 10 tables T1, T2, ..., T10, wherein the T1 has 12 columns, 100 data rows, so it can be indicated as T1=12*100; T2 has 5 columns, 200 data rows, indicated as T2=5*200. Similarly, T3=5*50, T4=2*300, T5=4*150, T6=6*100, T7=6*300, T8=3*200, T9=3*150, T10=4*400. In order to form a super schema based on the 10 tables above, respective columns of the respective tables are added one by one as shown in FIG. 3.

In an example, the table T1 is added first. Before the T1 is added, the super schema is a blank schema. Based on the blank schema, a new row is created for T1 in step 31. Then, steps 32-37 are executed with respect to the respective columns of the T1. As a result of executing steps 32-37 for T1, a table whose column arrangement is the same with that of T1 is formed as the super schema. FIG. 4A illustrates the super schema at this time. As shown in FIG. 4A, the super schema at this time only includes one row which corresponds to table T1 and can be used to represent all the data rows of the T1. Furthermore, the super schema includes 12 columns which respectively correspond to 12 columns of T1, wherein the T1Ci is indicative of the ith column in T1.

It will be appreciated that representing a table by creating only one new row is conducive to a simple and clear illustration, so such representation will be employed in all the examples below. Furthermore, in the following description, a single row in the super schema which is used for representing a table is also called as a super row when necessary to emphasize it. However, the representation of the super row is only for illustration purposes. In fact, it is also possible to create multiple rows in the super schema for a table according to the number of the real data rows of the table.

Then, as shown in steps 38-39, the process goes forward to the next table T2. Then, a new super row, i.e. row 2, is created for table T2 in step 31, so the super schema becomes a schema with 2 rows and 12 columns. After that, respective columns of the table T2 are added one by one. When it is assumed that the data type of the column 1, C1, of T2 is most compatible with the data type of the column 2 in the super schema (i.e. the column corresponding to T1C2) by comparison, in step 34, T2C1 is filled in a position corresponding to column 2 in row 2. Then, the next column C2 of the table T2 is judged. It is assumed that the data type of T2C2 is compatible with any one of column 2, column 5 and column 7 of the super schema. However, the column 2 has been taken up by another column (C1) in T2; therefore, a column that has a higher degree of compatibility (e.g., column 5) is selected from the free column 5 and column 7. Thus, T2C2 is filled in row 2 at a position corresponding to column 5.

Next, columns C3, C4 are processed similarly, and they are respectively filled in column 3 and column 6 of the super schema. Then, the last column C5 of T2 is processed. It is assumed that there is no existing column whose data type is compatible with that of C5 in the current super schema. Therefore, in step 35, a new column, i.e. column 13, is added in the super schema, and T2C5 is filled in the new row at the position corresponding to the new column. Furthermore, the data type of the T2C5 is regarded as the data type of the new column. FIG. 4B shows the super schema at this time. As shown in FIG. 4B, the super schema at this time includes 2 super rows, and the row 2 corresponds to the table T2. Furthermore, the super schema includes 13 columns through addition of new columns. Respective columns C1-C5 of the table T2 are filled at positions corresponding to column 2, column 5, column 3, column 6 and newly added column 13 respectively.

Then, respective columns of tables T3, T4 . . . T10 are added similarly till all 10 tables are processed. Thus, the super schema formed thereby has incorporated all the 10 tables T1-T10.

In an embodiment, respective tables are processed and added in a random order one by one. In another embodiment, first, the plurality of tables to be processed are ordered according to number of columns. For instance, the 10 tables T1-T10 mentioned above may be ordered as T1, T6, T7, T2, T3, T5, T10, T8, T9, T4 in an order of number of columns from great to small. After that, the tables are added one by one according to the order mentioned above. FIG. 5 shows a super schema formed according to an embodiment. More specifically, the super schema shown in FIG. 5 is a super schema formed by adding the 10 tables T1-T10 one by one in the order mentioned above. As shown in FIG. 5, the formed super schema has incorporated all the 10 tables. Furthermore, in the super schema, the columns having compatible data types from different tables share a same column in the super schema.

As the plurality of tables forming the super schema (e.g. the tables T1-T10 above) have different column numbers as well as different data types, therefore, there are some holes which are not occupied or taken up by any table in the formed super schema. For instance, the super schema as shown in FIG. 5 includes 16 columns. In row 1 corresponding to table T1, only the first 12 columns are filled with respective columns of T1, but the columns 13 to 16 behind are not taken up by columns of any table, thereby forming 4 holes. As the super schema in FIG. 5 is formed by adding tables in an order of number of columns from great to small, number of filled columns in respective rows of the super schema is smaller and smaller from the first row to the last row, i.e. from top to bottom; in other words, number of holes in respective rows of the super schema is greater and greater from top to bottom. For instance, there are 4 holes in the first row corresponding to table T1, 10 holes in the second row corresponding to table T6, and there are 14 holes in the last row corresponding to table T4. These holes are generated in forming the super schema by integrating tables with different column numbers and different data types. As positions of the holes are not taken up by any table, which means that there is no data from any table stored in the positions corresponding to the holes, therefore, the holes correspond to the free storage positions in the super schema. Therefore, a free storage capacity of the super schema may be estimated based on the generated holes, as shown in step 240 of FIG. 2.

Specifically, in an embodiment, in step 240, the free storage capacity of the super schema is estimated as proportional to the number of all the holes included in the super schema. For instance, as for the super schema shown in FIG. 5, the number of all the holes included therein may be determined and regarded as the free storage capacity of the super schema.

In another embodiment, in step 240, by considering the number of real rows of the table corresponding to the holes, the free storage capacity of the super schema is estimated as a total number of table units corresponding to all the holes. In fact, in case that a super row of the super schema is used to represent all m data rows of a table, a unit in the super row, also called as a super unit, actually represents m table units. If the super unit is not filled, the formed hole corresponds to m free table units. Specifically, the super schema in FIG. 5 includes 10 super rows which respectively correspond to 10 tables. The first super row represents the table T1. As the table T1 actually has 100 data rows, a super unit in the first super row of the super schema, including a hole, actually represents 100 table units of T1. Therefore, the 4 holes formed in the first super row correspond to 4*100 table units. Similarly, the third super row corresponds to table T7 which has 300 data rows. Therefore, the 10 holes formed in the third super row correspond to 10*300 table units. In such a manner, free storage capacity C(h) of the super schema in FIG. 5 may be calculated as: C(h)=4*100+10*100+10*300+ 11*200+11*50+12*150+12*400+13*200+13*150+ 14*300=22500.

On the other hand, in case that the super schema uses m rows to represent the m data rows of a table respectively, the total number of the holes directly corresponds to the total number of the table units. Therefore, in such a case, a number of corresponding table units may be obtained by determining the number of holes so as to evaluate the free storage capacity of the super schema.

In another embodiment, by further considering the data types of columns corresponding to the holes, the free storage capacity of the super schema is estimated as total data storage capacity corresponding to all the holes. Specifically, it may first determine the column in which a hole is located in the super schema, and then determine the data type of the column. As stated above, the data type of a column in the super schema is determined as the data type which has the maximum byte length among all the data types compatible with the column. Based on the determined data type of the column corresponding to the hole, data storage capacity of the corresponding hole may be determined on the basis of byte length of the data type. For instance, in the super schema as shown in FIG. 5, it is assumed that the data type compatible with the first column includes the integer, big int and small int etc., wherein the data type with a maximum byte length is the big int having 16 bytes for example. Thereby, the data storage capacity of a hole in the first column may be determined as 16 bytes. By determining data types of respective columns respectively, the data storage capacity of the holes in respective columns may be determined, and thus the total data storage capacity corresponding to all the holes in the entire super schema can be calculated.

In an embodiment, the real row numbers of the tables corresponding to the holes and the data types of columns corresponding to the holes are both taken into consideration at the same time to determine total data storage capacity corresponding to all the holes. As for a certain hole, the super row in which the hole is located determines the corresponding table and thus determines the number of table units corresponding to the hole; and the column in which the hole is located determines the corresponding data type. It may be deemed that the data type applies to all the table units corresponding to the hole. Therefore, the data storage capacity of the certain hole may be determined as the number of table units corresponding to the hole multiplied by the byte length of the data type corresponding to the hole. By performing the calculation above as to respective holes, the total data storage capacity of all the holes in the super schema can be determined. For instance, in the example of FIG. 5, as stated above, the third super row corresponds to table T7 which has 300 data rows, so each hole in the third super row corresponds to 300 table units. On the other hand, it is assumed that the data type of the first column is big int, having 16 bytes. Thus, data storage capacity of the hole in the third row and first column may be determined as 300*16 bytes. Similarly, data storage capacity of other holes may be determined so as to calculate and obtain total data storage capacity corresponding to all the holes.

Several kinds of execution modes for determining free storage capacity of the super schema based on the holes in the super schema are listed above. After reading aspects of the present description, those skilled in the art may further modify or recombine the execution modes above, for instance, by introducing some parameters, taking more factors into consideration and so on, so as to generate variant execution modes. The variant execution modes should also be contained within the scope of the aspects of the present invention.

Figure 6:
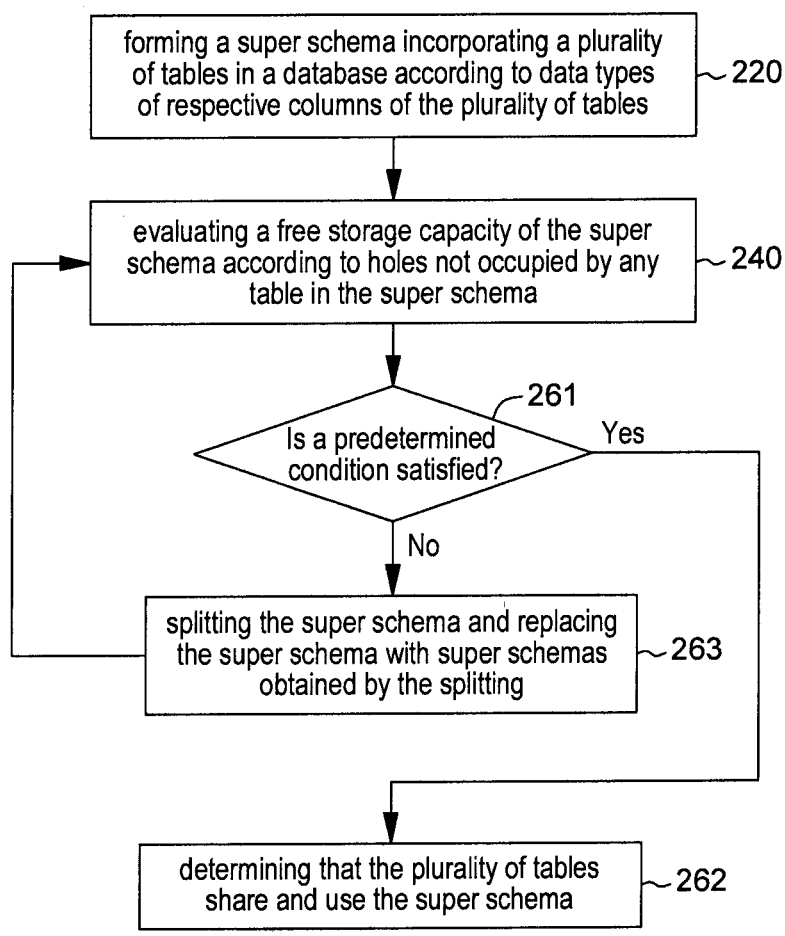
FIG. 6 shows a flow chart of managing sharing a relationship of tables according to an embodiment.

Based on the determined free storage capacity of the formed super schema, in step 260, the sharing relationship of the plurality of tables forming the super schema is determined according to the determined free storage capacity of the super schema. FIG. 6 shows a flow chart of managing the sharing relationship of tables according to an embodiment. The steps 220 and 240 in the flow chart of FIG. 6 are same with those shown in FIG. 2, but FIG. 6 illustrates the step 260 in more detail.

Specifically, step 260 includes: first, in step 261, judging whether a predetermined condition relevant to free storage capacity is satisfied based on the determined free storage capacity of the super schema. If the predetermined condition is satisfied, in step 262, it is determined that the plurality of tables may share the super schema. On the other hand, if the predetermined condition is not satisfied, in step 263, the super schema is split and the initial super schema is replaced with super schemas obtained by the splitting, and then the process returns to step 240. Then, step 240 is executed again. Now, free storage capacity is evaluated with respect to current new super schema, i.e. the super schema obtained by the splitting. In case of not satisfying the predetermined condition, steps of splitting and free storage capacity evaluating shall be executed repeatedly till the predetermined condition is satisfied.

In an embodiment, the above predetermined condition relevant to free storage capacity is that the free storage capacity of the super schema is smaller than a predetermined threshold value. More specifically, in case that the free storage capacity of the super schema is estimated as number of holes, the predetermined threshold value may for example be a specific number of holes; in case that the free storage capacity of the super schema is estimated as total number of the table units corresponding to the holes, the predetermined threshold value may for example be a specific number of units; in case that the free storage capacity of the super schema is estimated as total data storage capacity corresponding to the holes, the predetermined threshold value may for example be a specific storage capacity. In other cases, the predetermined threshold value may be set correspondingly to judge whether the free storage capacity of the super schema is too high.

In an embodiment, the above predetermined condition relevant to free storage capacity is that ratio of the free storage capacity of the super schema to initial storage capacity of the plurality of tables forming the super schema is smaller than a predetermined ratio. More specifically, in case that the free storage capacity of the super schema is estimated as number of holes, the initial storage capacity of the plurality of tables forming the super schema may be determined as the total number of units in the super schema, and thus the predetermined condition above is set as the ratio of the number of holes to the total number of units in the super schema is smaller than a predetermined ratio. In case that the free storage capacity of the super schema is estimated as the total number of the table units corresponding to the holes, the initial storage capacity of the plurality of tables forming the super schema may be determined as the total number of the table units of the plurality of tables, and thus the predetermined condition above is set as the ratio of the total number of the table units corresponding to the holes to the total number of the table units of the plurality of tables is smaller than a predetermined ratio. In case that the free storage capacity of the super schema is estimated as the total data storage capacity corresponding to the holes, the initial storage capacity of the plurality of tables forming the super schema may be determined as the total data storage capacity of the plurality of tables, and thus the predetermined condition above is set as the ratio of the total data storage capacity corresponding to the holes to the total data storage capacity of the plurality of tables is smaller than a predetermined ratio. In other cases, the initial storage capacity above and the predetermined ratio may be determined correspondingly in other manners, so as to judge whether the free storage capacity of the super schema is too high.

In an embodiment, as stated above, a plurality of super schemas are formed by splitting the initial super schema. As for the plurality of super schemas obtained by the splitting, it may be respectively judged whether the free storage capacities of the respective super schemas satisfy the predetermined condition above. In an implementation, the free storage capacities of the plurality of super schemas may also be taken into consideration overall to set the predetermined condition. In an example, the predetermined condition relevant to free storage capacity may be set as the sum of the free storage capacities of the super schemas obtained by the splitting is smaller than a predetermined threshold value. In another example, the predetermined condition relevant to free storage capacity may be set as the ratio of the sum of the free storage capacities of the super schemas obtained by the splitting to the initial storage capacity of the plurality of tables forming the initial super schema is smaller than a predetermined ratio. The calculation and determining manners of the predetermined threshold value and the initial storage capacity etc. may be obtained referring to the examples mentioned afore.

It will be appreciated that the above predetermined condition relevant to free storage capacity is used for judging whether the free storage capacity of the super schemas is too high. Though several concrete examples of the predetermined condition are described above, after reading aspects of the present description, those skilled in the art may modify or recombine the setting manners of the predetermined condition according to the evaluating manners of the free storage capacity to generate variant implementation modes.

As shown in FIG. 6, if the predetermined condition above is not satisfied (i.e. the free storage capacity corresponding to the super schema is too high), the super schema mentioned above is split in step 263 and the super schemas obtained by the splitting shall be used to replace the initial super schema. In the process of splitting the initial super schema in step 263, it shall be ensured that any table is completely located in a certain super schema after the splitting and shall not be split. If there are blank columns in a certain generated super schema after the splitting process, the blank columns may be deleted. As for the splitting process above, various implementations may be adopted as described below.

In an embodiment, in step 263, rows of the super schema may be randomly or evenly split so as to obtain a plurality of split super schemas. For instance, as for the super schema having 10 rows (corresponding to 10 tables) as shown in FIG. 5, two super schemas which respectively have 5 rows may be obtained by evenly splitting the 10 rows.

In an embodiment, in step 263, taking a specific row in the super schema as a reference, a reduced row that may be covered by the specific row is selected from the super schema, wherein each filled unit in the reduced row shares a same column with a certain filled unit in the specific row. Then, the super schema is split as a super schema formed by the specific row and its reduced rows and a super schema formed by the remaining rows. In an example, the row corresponding to the table whose number of column is the maximum is selected as the specific row above, and the super schema is split by taking this row as a reference.

In an embodiment, in step 263, a super schema is split in manner of eliminating a hole matrix formed by consecutive holes in the super schema. Specifically, in an example, a maximum hole matrix is determined in the super schema, and the super schema is split by eliminating the maximum hole matrix. In the process of determining the maximum hole matrix above, the order of the columns of the super schema may be adjusted to obtain a greater number of consecutive holes so as to form a maximum hole matrix. In an example, an arrangement of multiple hole matrixes in the super schema is determined such that the total number of holes in the matrixes is the maximum, and the super schema is split by eliminating the multiple hole matrixes at the same time. Furthermore, the number of table units corresponding to the hole matrix may be further considered, so that the splitting of the super schema may eliminate the hole matrix having a greatest number of table units.

Several implementations of splitting a super schema are described above. After reading aspects of the present description, those skilled in the art may further modify or recombine the implementations above, so as to generate variant execution modes. The variant execution modes should also be contained within the scope of aspects of the present invention.

Implementations of respective steps in FIG. 6 will be described below with reference to a concrete example. It is assumed a super schema as shown in FIG. 5 is formed based on the 10 tables T1-T10 in step 220. Then, in step 240, the free storage capacity of the super schema is estimated. In this example, the free storage capacity of the super schema is estimated as the total number of table units corresponding to all the holes. As stated above, in this case, the free storage capacity $C(h)$ of the super schema as shown in FIG. 5 may be estimated as 22500 (units). Then, in step 260, the sharing relationship of the T1-T10 is determined based on the free storage capacity. Specifically, first in step 261, it is judged whether the predetermined condition relevant to free storage capacity is satisfied. In this example, it is assumed that the predetermined condition is that the ratio of the sum of the free storage capacities of the respective super schemas to the initial storage capacity of the plurality of tables forming the initial super schema is smaller than a predetermined ratio. The initial storage capacity of the plurality of tables forming the initial super schema may be calculated as the total number of the table units of T1-T10. According to the descriptions as to the row number and column number of the tables T1-T10 afore, the initial storage capacity may be calculated and obtained as: $C(t)=12*100+5*200+5*50+2*300+4*150+6*100+6*300+3*200+3*150+4*400=8700$.

It is assumed that the predetermined ratio is set as 90%. It can be determined, in case that only the super schema as shown in FIG. 5 is formed, the ratio of the free storage capacity of the super schema to the initial storage capacity is $C(h)/C(t)=258\%$. Therefore, the predetermined condition is not satisfied, and then in step 263, the super schema as shown in FIG. 5 is split.

In order to split the super schema as shown in FIG. 5, in an example, taking the first row corresponding to T1 as a reference, a reduced row that can be covered by the first row is determined. According to the arrangement of the super schema as shown in FIG. 5, it can be easily determined that each of the rows corresponding to T6, T10 and T9 can be covered by the first row, and thus can serve as reduced rows of the first row. Therefore, the super schema may be split as a super schema formed by the first row as well as the reduced rows thereof and a super schema formed by the remaining rows. Thus, the two super schemas as shown in FIGS. 7A-7B may be obtained. The super schema ST1 is formed by tables T1, T6, T10 and T9, and the super schema ST2 is formed by the remaining rows. The two super schemas are used to replace the initial super schema as shown in FIG. 5.

Then, the process returns to step 240 in which the free storage capacities of the respective super schemas are estimated. According to the same estimating method afore, the free storage capacity of the super schema ST1 may be estimated as $C1(h)=6*100+8*100+8*400+9*150=59500$, and the free storage capacity of the super schema ST2 may be estimated as $C2(h)=6*300+7*200+7*50+8*150+9*200+10*300=95500$. Then, in step 261, it is judged again whether the predetermined condition is satisfied. Now, sum of the free storage capacities of the respective super schemas is $C(h)=C1(h)+C2(h)=15500$, and the ratio to the initial storage capacity is $C(h)/C(t)=15500/8700=178\%$ which is still higher than the predetermined ratio of 90%. Therefore, the process goes forward to step 263 to perform splitting again.

In order to go on splitting the two super schemas ST1 and ST2 as shown in FIGS. 7A-7B, in an example, the super schemas are split by eliminating hole matrixes at most. FIGS. 8A-8B show the arrangement of the hole matrixes in the super schema ST2. Specifically, the arrangement of FIG. 8A includes a hole matrix of 2*3 in the upper right corner and a hole matrix of 5*3 in the lower part. The arrangement of FIG. 8B includes a hole matrix of 3*2 in the upper part and a hole matrix of 3*4 in the lower part. The hole matrixes are shown in grey in the figures. It can be seen that the free columns in the hole matrixes are not necessarily consecutive (e.g. the hole matrix in the lower part in FIG. 8A and the hole matrix in the upper part in FIG. 8B), because the issue regarding consecutiveness can be overcome by changing the order of the columns. Obviously, the arrangement of FIG. 8A has more number of holes in the hole matrixes in total. More specifically, the number of table units corresponding to the hole matrixes may further be taken into consideration. Specifically, the sum of numbers of table units corresponding to the two hole matrixes as shown in FIG. 8A is 2*(300+200+50)+5*(150+200+300)=4350, and the sum of numbers of table units corresponding to the two hole matrixes as shown in FIG. 8B is 3*(300+200)+3*(50+150+200+300)=3600. That means, eliminating the two hole matrixes shown in FIG. 8A may lead to eliminating more free storage capacity relevant to the table units. Therefore, the hole matrix arrangement as shown in FIG. 8A is selected to be eliminated. Similarly, by considering the hole arrangement in the super schema ST1, the super schema ST1 can be split by eliminating more holes or more table units.

FIGS. 9A-9D show four super schemas obtained by splitting according to an embodiment, wherein the super schemas ST11 and ST12 are two super schemas obtained by splitting the super schema ST1 as shown in FIG. 7A, and the super schemas ST21 and ST22 are two super schemas obtained by splitting the super schema ST2 as shown in FIG. 7B according to the splitting solution as shown in FIG. 8A. After the splitting, the process returns to step 240 again to estimate the free storage capacities of respective super schemas. As can be seen, the ST11 corresponds to the table T1 and does not have a hole, so the free storage capacity thereof is 0. After calculation, it can be determined that free storage capacities of other three super schemas are respectively 2550, 2450 and 2750. Now, the sum of free storage capacities of the respective super schemas is C (h)=7750, and the ratio to the initial storage capacity is C(h)/C(t)= 7750/8700=89%. Therefore, the predetermined condition in step 261 is satisfied. Thus, in step 262, it is determined that the tables T1-T10 achieve the table sharing according to the formed super schemas.

Execution processes of the method of FIG. 2 and FIG. 6 are described in combination with concrete examples. With the method above, the sharing relationship of a plurality of existing tables (e.g. T1-T10) can be determined. On the other hand, in the process of managing the sharing relationship of the tables in the database, another typical situation is to design a sharing solution for a newly created table when the new table is created for a tenant. Therefore, in an embodiment, the method of managing the sharing relationship of the tables further comprises determining a schema for storing a new table in response to a request of creating the new table.

Figure 10:
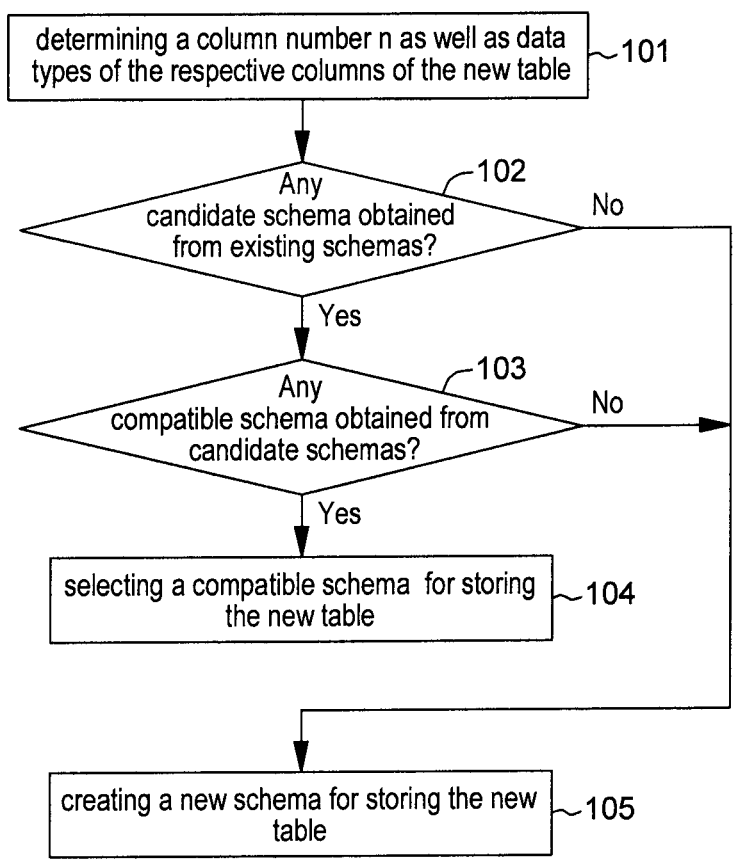
FIG. 10 shows a flow chart of determining a schema for storing a new table according to an embodiment.

FIG. 10 shows a flow chart of determining a schema for storing a new table according to an embodiment. As shown in FIG. 10, first, in step 101, the number of columns n as well as the data types of the respective columns in the new table are determined. It will be appreciated, in order to create a new table, it is required to specify table information including number of columns, stored contents of the respective columns, and data types of the new table in the creating request. Therefore, the information about number of columns n and data types may be determined by obtaining the creating request. Then, in step 102, at least one candidate schema whose number of columns is greater than or equal to the number of columns n of the new table is obtained from existing schemas of the database. The existing schemas may be either a schema of a single existing table in the database or a super schema formed by a plurality of existing tables together. For the sake of simplicity, the tables T1-T10 mentioned afore are regarded as existing tables in the database. In an embodiment, the respective tables are stored separately and independently, so as to form their own corresponding schemas respectively. In another embodiment, by organizing and determining the sharing relationship, a part of the tables makes a sharing group and forms a super schema. For instance, as shown in FIGS. 9A-9B, the table T1 is stored separately and has its own particular schema; however, the tables T6, T10 and T9 form a super schema ST12 together. Each of these schemas may act as an existing schema and be compared to the newly created table.

Then, the obtained candidate schemas are further analyzed and judged. Specifically, in step 103, at least one compatible schema, which includes n columns with data types respectively covering the data types of the n columns of the new table, is obtained from the candidate schemas. Covering of the data types requires not only that the data types are compatible with each other, but also that the byte length of the former data type is greater than or equal to that of the latter. For instance, the big int may cover int and small int, and a character whose byte length is 1000 bytes may cover characters whose byte size is within 1000 bytes, etc. In an embodiment, in the process of data type comparison, with respect to a specific data type T of a specific column in a new table, if there are a plurality of data types from a plurality of columns in the candidate schemas that may all cover the data type T, a data type which is the closest to the specific data type T shall be selected therefrom. Those skilled in the art can use various existing algorithms according to standards in the prior art to determine a compatible schema by comparing the data types of respective columns of the candidate schemas and the new table.

In case that at least one compatible schema is obtained, in step 104, a compatible schema is selected as a schema for storing the new table. It will be appreciated that in case that only one compatible schema is obtained in step 103, the only compatible schema can be directly taken and used for storing the new table. In case that a plurality of compatible schemas are obtained, in an embodiment, a compatible schema having the smallest number of columns is selected to store the new table. In another embodiment, a schema which is more compatible with the data types of the new table is selected from the plurality of compatible schemas for storing the new table. As stated above, as for compatibility of data types, those skilled in the art are capable of making judgment according to existing standards in the prior art. For instance, it may be deemed that the data types whose character length difference is smaller have a higher compatibility.

On the other hand, if there is no candidate schema obtained from the existing schemas in step 102, or there is no compatible schema obtained from the candidate schemas in step 103, then the new table cannot achieve sharing with any existing schema. In such case, according to an embodiment, in step 105, a new schema is created with respect to the new table for storing the new table.

Figure 11A:
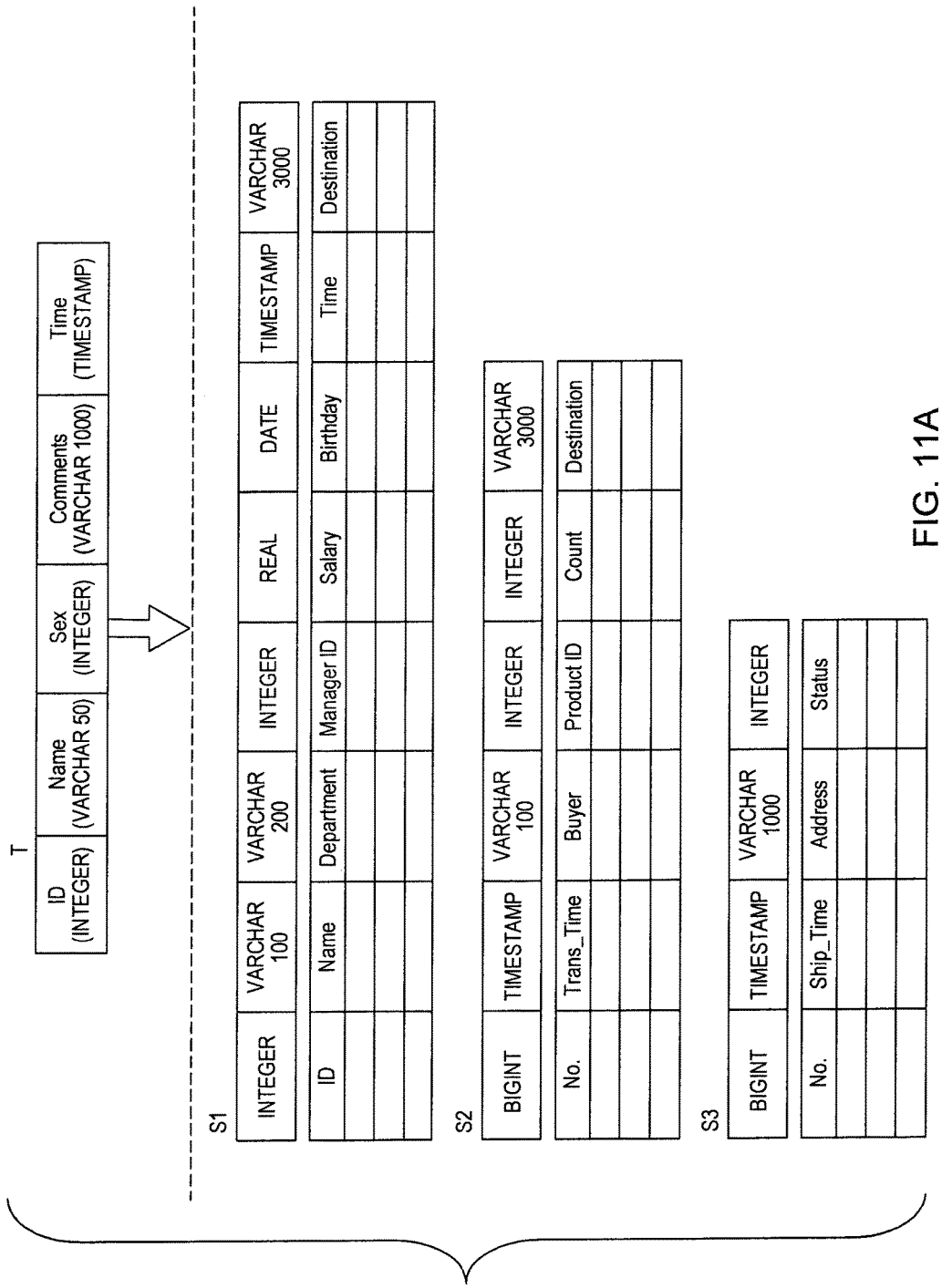
FIGS. 11A-11B show a schematic diagram of determining a schema for a new table in an example.
Figure 11B:
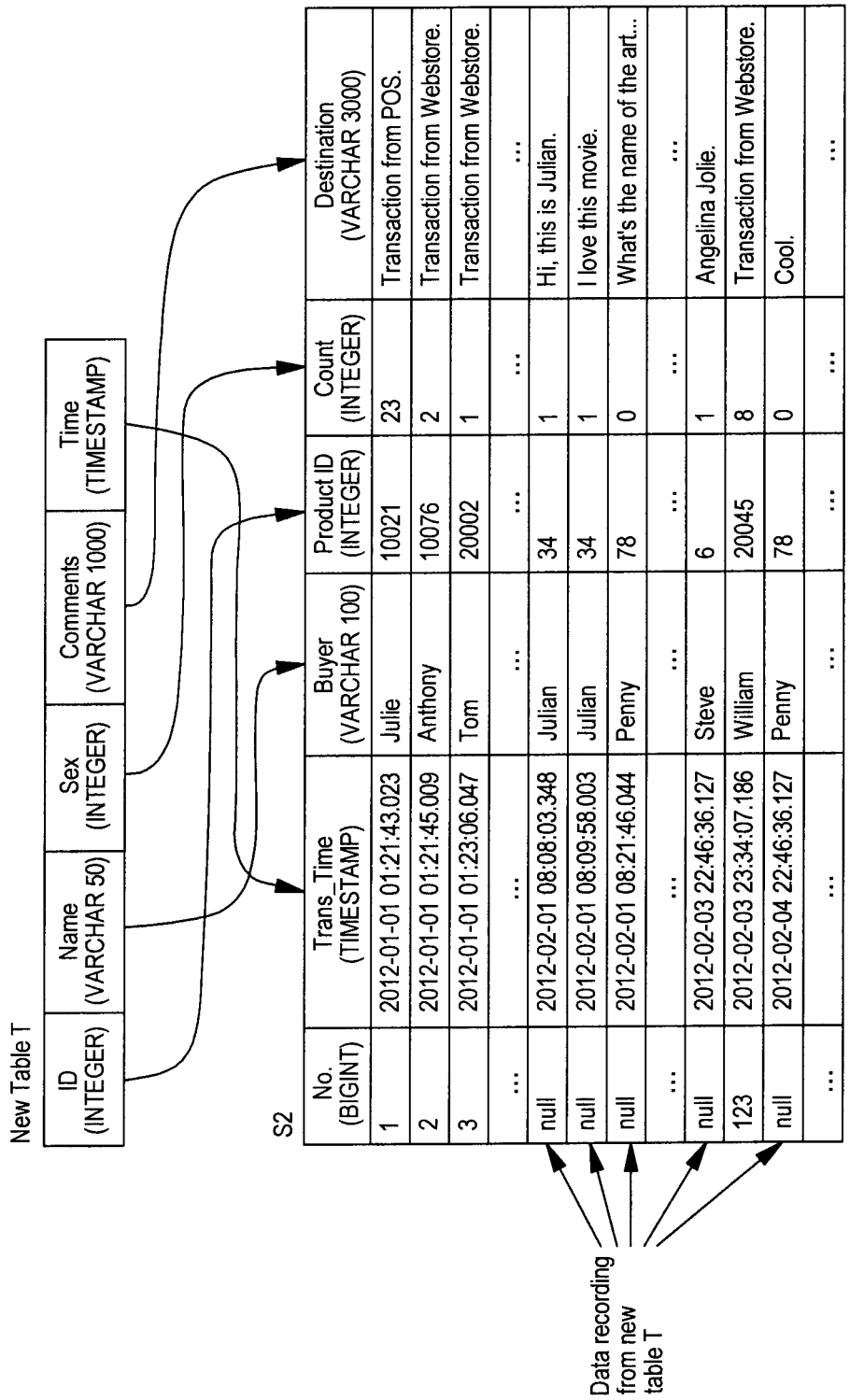

Executions of respective steps above will be described below with reference to a concrete example. Specifically, FIG. 11A shows an example of existing schemas and a new table. In the example of FIG. 11A, there are three existing schemas S1, S2 and S3, wherein S1 has eight columns, S2 has six columns, S3 has four columns, and data types of the respective columns in the respective existing schemas are as shown in the additional remark at top. It is assumed that a new table T to be created has five columns, and the data types of the five columns are respectively integer, varchar 50, integer, varchar 1000, and timestamp. On basis of obtaining the above information regarding the new table in step 101 as shown in FIG. 10, in step 102, candidate schemas are obtained based on the numbers of columns of the existing schemas. Specifically, the existing schemas S1 and S2 both have numbers of columns greater than the number of columns of the new table, and thus can be taken as candidate schemas. In step 103, the data types of the candidate schemas are compared to the data types of the respective columns of the new table so as to obtain compatible schemas. Specifically, by comparing the data types, it can be determined that S1 and S2 can both serve as compatible schemas. As S2 has a smaller number of columns, in step 104, S2 is selected as a schema for storing the new table T. FIG. 11B shows correspondence of data type covering between schema S2 and the new table. Specifically, the data type of the first column of the new table is integer, which may be covered by the data type of the fourth column of S2, and the data type of the second column, varchar 50, may be covered by the data type of the third column of S2, varchar 100. Based on such covering correspondence, data of the new table T may be stored in respective columns in S2 which are of covering correspondence respectively. Thus, the new table may achieve sharing with the existing schemas to save maintaining cost of schemas.

Figure 12:
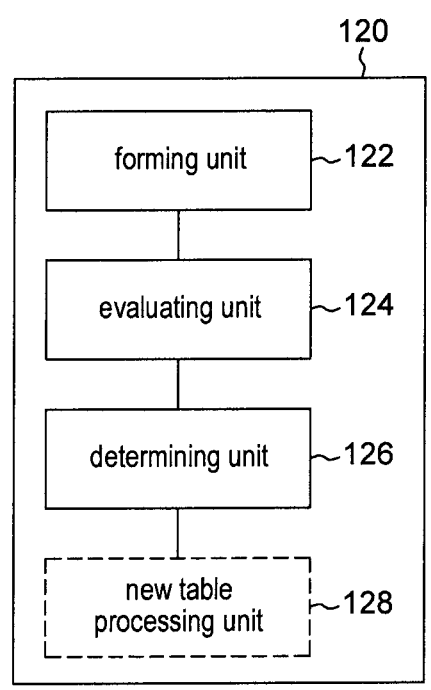
FIG. 12 shows a schematic block diagram of an apparatus for managing a sharing relationship of tables according to an embodiment of the present invention.

Based on the same inventive concept, aspects of the present invention further provide an apparatus for managing sharing relationship of tables. FIG. 12 shows a schematic block diagram of an apparatus for managing sharing relationship of tables according to an embodiment of the present invention. As shown in the figure, the apparatus for managing sharing relationship of tables is indicated as 120 as a whole. Specifically, the apparatus 120 comprises, for instance, a forming unit 122 configured to form a super schema incorporating a plurality of tables in a database according to data types of respective columns of the plurality of tables; an evaluating unit 124 configured to evaluate a free storage capacity of the super schema according to holes not occupied by any table in the super schema; and a determining unit 126 configured to determine the sharing relationship of the plurality of tables according to the free storage capacity of the super schema.

In an embodiment, the abovementioned forming unit 122 comprises (not shown): a row creating module configured to, as for a certain table Ti in the plurality of tables, create a new row representing the table Ti in the super schema; and a column filling module configured to, as for a certain column Cj in the table Ti, in case that there is an existing column in the super schema which has a compatible data type with the column Cj, fill the column Cj in the new row at a position corresponding to the existing column; otherwise, to add a new column in the super schema and fill the column Cj in the new row at a position corresponding to the added new column.

According to an embodiment, the evaluating unit 124 is configured to determine a total number of table units corresponding to all the holes in the super schema as the free storage capacity of the super schema.

According to another embodiment, the evaluating unit 124 is configured to determine a total data storage capacity corresponding to all the holes in the super schema as the free storage capacity of the super schema.

In an embodiment, the abovementioned determining unit 126 comprises (not shown): a condition judging module configured to judge whether a predetermined condition relevant to free storage capacity is satisfied based on the free storage capacity of the super schema; a splitting module configured to split the super schema and replace the super schema with super schemas obtained by the splitting in case that the predetermined condition is not satisfied; and a sharing determining module configured to determine that the plurality of tables share and use the super schema in case that the predetermined condition is satisfied.

According to an embodiment, the predetermined condition comprises one of: the free storage capacity of the super schema is smaller than a predetermined threshold value; ratio of the free storage capacity of the super schema to initial storage capacity of the plurality of tables forming the super schema is smaller than a predetermined ratio; and ratio of sum of free storage capacities of the super schemas obtained by the splitting to the initial storage capacity of the plurality of tables forming the super schema is smaller than a predetermined ratio.

In an embodiment, the abovementioned splitting module is configured to: split the super schema by eliminating a hole matrix formed by consecutive holes in the super schema.

In another embodiment, the abovementioned splitting module is configured to: select a reduced row which can be covered by a specific row in the super schema taking the specific row as a reference; and split the super schema as a super schema formed by the specific row as well as the reduced row thereof and a super schema formed by remaining rows.

In an embodiment, the apparatus 120 further comprises a new table processing unit 128 (shown with dashed lines) configured to determine a schema for storing a new table in response to a request of creating the new table.

According to an embodiment, the new table processing unit 128 comprises (not shown): an information determining module configured to determine a column number n as well as data types of the respective columns of the new table; a candidate schema obtaining module configured to obtain at least one candidate schema with a column number greater than or equal to the column number n of the new table from existing schemas in the database; a compatible schema obtaining module configured to obtain at least one compatible schema, which includes n columns with data types respectively covering the data types of the n columns of the new table, from the at least one candidate schema; a selecting module configured to select a compatible schema as a schema for storing the new table.

According to an embodiment, the new table processing unit 128 further comprises (not shown) a creating module configured to create a new schema for storing the new table in case that no candidate schema is obtained or no compatible schema is obtained.

It may be appreciated that the respective units in FIG. 12 are divided as for functions, and thus the respective units may be located on the same or different physical platform. Moreover, the specific way to implement the respective units in FIG. 12 corresponds to the description of the respective steps in conjunction with specific examples, and will not be described here in detail.

Using the method and apparatus of the embodiments described above, the sharing relationship of a large number of tables in a database can be managed so as to design or optimize the sharing solution among the tables.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a sharing relationship of tables, comprising:
    forming a super schema incorporating a plurality of tables in a database according to data types of respective columns of the plurality of tables, wherein a column in the super schema having a particular data type includes a column of the particular data type from one or more tables of the plurality of tables;
    evaluating a free storage capacity of the super schema according to holes not occupied by any table in the super schema; and
    determining the sharing relationship of the plurality of tables according to the free storage capacity of the super schema, the sharing relationship indicating whether the plurality of tables share the super schema, and wherein the determining includes:
        checking whether a predetermined condition that is based on the free storage capacity is satisfied, wherein based on the predetermined condition being satisfied, the sharing relationship is that the plurality of tables share the super schema, and based on the predetermined condition not being satisfied, splitting the super schema and replacing the super schema with super schemas obtained by the splitting.

2. The method of claim 1, further comprising performing, for one or more of the super schemas obtained the splitting, the evaluating and the determining.

3. The method of claim 1, wherein the forming the super schema incorporating the plurality of tables comprises:
    as for a certain table Ti in the plurality of tables, creating a new row representing the table Ti; and
    as for a certain column Cj in the table Ti, in case that there is an existing column in the super schema which has a compatible data type with the column Cj, filling the column Cj in the new row at a position corresponding to the existing column; otherwise, adding a new column in the super schema and filling the column Cj in the new row at a position corresponding to the added new column.

4. The method of claim 1, wherein the evaluating the free storage capacity of the super schema comprises one of: determining a total number of table units corresponding to all the holes in the super schema as the free storage capacity of the super schema; and determining a total data storage capacity corresponding to all the holes in the super schema as the free storage capacity of the super schema.

5. The method of claim 1, wherein the predetermined condition comprises one of:
    the free storage capacity of the super schema is smaller than a predetermined threshold value;
    ratio of the free storage capacity of the super schema to initial storage capacity of the plurality of tables forming the super schema is smaller than a predetermined ratio; and
    ratio of a sum of free storage capacities of the super schemas obtained by the splitting to the initial storage capacity of the plurality of tables forming the super schema is smaller than a predetermined ratio.

6. The method of claim 1, wherein the splitting the super schema comprises: splitting the super schema by eliminating a hole matrix formed by consecutive holes in the super schema.

7. The method of claim 1, wherein the splitting the super schema comprises:
    selecting a reduced row which can be covered by a specific row in the super schema taking the specific row as a reference; and
    splitting the super schema as a super schema formed by the specific row as well as the reduced row thereof and a super schema formed by remaining rows.

8. The method of claim 1, further comprising: determining a schema for storing a new table in response to a request of creating the new table, which comprises:
    determining a column number n as well as data types of the respective columns of the new table;
    obtaining at least one candidate schema with a column number greater than or equal to the column number n of the new table from existing schemas in the database;
    obtaining at least one compatible schema, which includes n columns with data types respectively covering the data types of the n columns of the new table, from the at least one candidate schema;
    selecting a compatible schema as the schema for storing the new table; and
    creating a new schema for storing the new table in case that no candidate schema is obtained or no compatible schema is obtained.

9. A computer system for managing a sharing relationship of tables, the computer system comprising:
    a memory; and
    a processor in communication with the memory, wherein the computer system is configured to perform a method, said method comprising:
        forming a super schema incorporating a plurality of tables in a database according to data types of respective columns of the plurality of tables, wherein a column in the super schema having a particular data type includes a column of the particular data type from one or more tables of the plurality of tables;
        evaluating a free storage capacity of the super schema according to holes not occupied by any table in the super schema; and
        determining the sharing relationship of the plurality of tables according to the free storage capacity of the super schema, the sharing relationship indicating whether the plurality of tables share the super schema, and wherein the determining includes:
            checking whether a predetermined condition that is based on the free storage capacity is satisfied, wherein based on the predetermined condition being satisfied, the sharing relationship is that the plurality of tables share the super schema, and based on the predetermined condition not being satisfied, splitting the super schema and replacing the super schema with super schemers obtained by the splitting.

10. The computer system of claim 9, wherein the method further comprises performing, for one or more of the super schemas obtained by the splitting, the evaluating and the determining.

11. The computer system of claim 9, wherein the forming comprises:
as for a certain table Ti in the plurality of tables, creating a new row representing the table Ti in the super schema; and
as for a certain column Cj in the table Ti, in case that there is an existing column in the super schema which has a compatible data type with the column Cj, filling the column Cj in the new row at a position corresponding to the existing column; otherwise, adding a new column in the super schema and filling the column Cj in the new row at a position corresponding to the added new column.

12. The computer system of claim 9, wherein the evaluating the free storage capacity of the super schema comprises one of: determining a total number of table units corresponding to all the holes in the super schema as the free storage capacity of the super schema; and determining a total data storage capacity corresponding to all the holes in the super schema as the free storage capacity of the super schema.

13. The computer system of claim 9, wherein the predetermined condition comprises one of:
the free storage capacity of the super schema is smaller than a predetermined threshold value;
ratio of the free storage capacity of the super schema to initial storage capacity of the plurality of tables forming the super schema is smaller than a predetermined ratio; and
ratio of a sum of free storage capacities of the super schemas obtained by the splitting to the initial storage capacity of the plurality of tables forming the super schema is smaller than a predetermined ratio.

14. The computer system of claim 9, wherein the splitting the super schema comprises splitting the super schema by eliminating a hole matrix formed by consecutive holes in the super schema.

15. The apparatus computer system of claim 9, wherein the splitting the super schema comprises:
selecting a reduced row which can be covered by a specific row in the super schema taking the specific row as a reference; and
splitting the super schema as a super schema formed by the specific row as well as the reduced row thereof and a super schema formed by remaining rows.

16. The computer system of claim 9, further comprising determining a schema for storing a new table in response to a request of creating the new table, comprising:
determining a column number n as well as data types of the respective columns of the new table;
obtaining at least one candidate schema with a column number greater than or equal to the column number n of the new table from existing schemas in the database;
obtaining at least one compatible schema, which includes n columns with data types respectively covering the data types of the n columns of the new table, from the at least one candidate schema;
selecting a compatible schema as the schema for storing the new table; and
creating a new schema for storing the new table in case that no candidate schema is obtained or no compatible schema is obtained.

17. A computer program product for managing a sharing relationship of tables, comprising:
a non-transitory computer readable storage medium readable by a processing circuit and storing instructions for execution by the processing circuit for performing a method comprising:
forming a super schema incorporating a plurality of tables in a database according to data types of respective columns of the plurality of tables, wherein a column in the super schema having a particular data type includes a column of the particular data type from one or more tables of the plurality of tables;
evaluating a free storage capacity of the super schema according to holes not occupied by any table in the super schema; and
determining the sharing relationship of the plurality of tables according to the free storage capacity of the super schema, the sharing relationship indicating whether the plurality of tables share the super schema, and wherein the determining includes:
checking whether a predetermined condition that is based on the free storage capacity is satisfied, wherein based on the predetermined condition being satisfied, the sharing relationship is that the plurality of tables share the super schema, and based on the predetermined condition not being satisfied, splitting the super schema and replacing the super schema with super schemas obtained by the splitting.

18. The computer program product of claim 17, wherein the method further comprises: determining a schema for storing a new table in response to a request of creating the new table, which comprises:
determining a column number n as well as data types of the respective columns of the new table;
obtaining at least one candidate schema with a column number greater than or equal to the column number n of the new table from existing schemas in the database;
obtaining at least one compatible schema, which includes n columns with data types respectively covering the data types of the n columns of the new table, from the at least one candidate schema;
selecting a compatible schema as the schema for storing the new table; and
creating a new schema for storing the new table in case that no candidate schema is obtained or no compatible schema is obtained.

19. The computer program product of claim 17, wherein the method further comprises performing, for one or more of the super schemas obtained by the splitting, the evaluating and the determining.

20. The computer program product of claim 17, wherein the evaluating the free storage capacity of the super schema comprises one of: determining a total number of table units corresponding to all the holes in the super schema as the free storage capacity of the super schema; and determining a total data storage capacity corresponding to all the holes in the super schema as the free storage capacity of the super schema.

* * * * *